United States Patent [19]

Fillion

[11] Patent Number: 5,497,101
[45] Date of Patent: Mar. 5, 1996

[54] DEVICE FOR EFFECTING DYNAMIC MEASUREMENT OF THE DISTANCE BETWEEN THE FACING FACES OF THE ROTOR AND THE STATOR OF A ROTARY MACHINE

[75] Inventor: Jean-Claude Fillion, Paris, France

[73] Assignee: Societe Nationale D'Etude et de Construction de Moteurs D'Aviation "Snecma", Paris, France

[21] Appl. No.: 343,870

[22] Filed: Nov. 17, 1994

[30] Foreign Application Priority Data

Nov. 17, 1993 [FR] France .................................. 93 13708

[51] Int. Cl.$^6$ .................................................. G01R 27/26
[52] U.S. Cl. ........................... 324/662; 324/661; 324/686
[58] Field of Search ..................................... 324/658, 660, 324/661, 662, 676, 681, 686, 690

[56] References Cited

U.S. PATENT DOCUMENTS

| | | |
|---|---|---|
| 4,063,167 | 12/1977 | Duly . |
| 4,292,632 | 9/1981 | Yeakley ..................................... 324/660 |
| 4,823,071 | 4/1989 | Ding et al. ............................... 324/662 |
| 4,876,505 | 10/1989 | Osborne . |
| 5,101,165 | 3/1992 | Rickards .................................. 324/662 |
| 5,119,036 | 6/1992 | Rickards et al. ......................... 324/662 |

FOREIGN PATENT DOCUMENTS

| | | |
|---|---|---|
| 0172766 | 2/1986 | European Pat. Off. . |
| 0246576 | 11/1987 | European Pat. Off. . |
| 0378017 | 7/1990 | European Pat. Off. . |
| 2608751 | 6/1988 | France . |
| 2073427 | 10/1981 | United Kingdom . |

OTHER PUBLICATIONS

Garimella R. Sarma, et al., "Capacitance–Type Blade–Tip Clearance Measurement System Using a Dual Amplifier with Ramp/DC Inputs and Integration", IEEE Transactions on Instruments and Measurement, vol. 41, No. , Oct. 1992, pp. 674–678.

*Primary Examiner*—Kenneth A. Wieder
*Assistant Examiner*—Glenn W. Brown
*Attorney, Agent, or Firm*—Oblon, Spivak, McClelland, Maier & Neustadt

[57] ABSTRACT

A device for dynamic measurement of the clearance between the tips of rotating blades and the stator of a rotary machine comprises a capacitive sensor polarized by a direct voltage and conditioned by a continuously polarized load amplifier having a high-pass filter structure, preferably of the second order. The construction of the sensor and of the cable connecting it to the conditioning device is coaxial. The calibration of the measuring chain can be performed theoretically, without having recourse to any testing.

12 Claims, 3 Drawing Sheets

DEVICE FOR EFFECTING DYNAMIC MEASUREMENT OF THE DISTANCE BETWEEN THE FACING FACES OF THE ROTOR AND THE STATOR OF A ROTARY MACHINE

BACKGROUND OF THE INVENTION

1. Field of the Invention

The present invention relates to a device enabling a dynamic measurement of the distance between the facing faces of the rotor and the stator of a rotary machine to be made by a capacitive method. The invention is particularly applicable to the dynamic measurement of the radial clearance existing between the tips of the blades of a turbomachine wheel and the wall of the casing which surrounds the wheel.

2. Summary of the Prior Art

The clearance existing between the facing faces of the rotor and the stator of a rotary machine is an important parameter which has an appreciable influence upon the performance of the machine, whatever the type of rotary machine involved, and this applies particularly to the clearances between the tips of the rotor blades and the surrounding casing in compressors and turbines. As these clearances may vary substantially with thermal and mechanical changes, it is of the utmost importance to engine designers to be conversant with the changes in these clearances over the whole of the circumference of the interface between the rotor and stator in an actual machine operating at a constant speed or at a transitional speed. To carry out dynamic measurement of this clearance, it is known to use electrical, optical or radiofrequency based proximity sensors.

The invention relates to a device of the type which carries out the measurement using a capacitive electrically based method involving measuring the load of a capacitor formed by a conductive surface of a sensor fixed in the stator opposite the rotor and a conductive surface of the rotor which is brought opposite the conductive surface of the stator in the course of the rotation of the rotor relative to the stator.

The characteristics of a device for measuring by this capacitive method are dependent upon the nature of the polarization and the nature of the conditioning of the capacitive sensor.

Certain known measuring devices utilize a capacitive sensor polarized by an alternating voltage and conditioned either by an oscillator or by a load amplifier. In these devices, the technology of the capacitive sensor and the connecting cable between the sensor and the measuring chain is generally triaxial.

Other known measuring devices utilize a capacitive sensor polarized by a direct voltage and conditioned by a voltage amplifier, the technology of the sensor and the connecting cable between the sensor and the measuring chain in this case being generally coaxial.

In all these known devices, the sensor and the connecting cable have residual capacitances which affect the calibration of the measuring chain. Calibration must therefore be carried out every time there is a change of sensor or connecting cable.

Moreover, all these known devices require test calibration of the measuring chain on site, which does not enable the manufacturer to carry out calibration with a view to reproducible series usage.

Finally, for all these known devices, the measurement results are influenced by the temperature of the sensor and of the connecting cable.

SUMMARY OF THE INVENTION

It is an object of the invention to provide a device for carrying out dynamic measurements using a capacitive method which does not suffer from the drawbacks of the known devices, and for which test calibration of the measuring chain on site is not necessary, thereby enabling usage in series to carry out an active checking of the clearances.

It is another object of the invention to provide a measuring device which enables either measurement of the mean clearance of the blading or measurement of the individual clearance of each blade.

To this end, the measuring device of the invention uses a capacitive sensor polarized by a direct voltage and conditioned by a load amplifier having a high-pass filter structure, preferably of the second order. The technology of the sensor and of the connecting cable is coaxial. The calibration of the measuring chain is performed in a theoretical manner without having recourse to any testing.

More particularly, according to the invention there is provided a device for effecting dynamic measurement of the clearance between the tips of rotating blades and the stator of a turbomachine, comprising at least one capacitive sensor intended to be mounted in the stator in line with said blades, said sensor having an electrode intended to cooperate with the tips of said blades so as to define a capacitor with variable capacitance every time a blade passes under the electrode of said sensor, and at least one measuring chain connected to said sensor, said measuring chain including a device for conditioning the sensor and providing an output signal, and means for processing the signal from said conditioning device, wherein said conditioning device comprises a load amplifier having a high-pass filter structure, and said capacitive sensor and said load amplifier are arranged to be polarized by the same direct voltage, said direct polarization voltage being determined in such a manner that the mean value of said output signal from said conditioning device is equal to a desired voltage value.

Other preferred features and advantages of the invention will become apparent from the following description of the preferred embodiments, given by way of non-limitative example, with reference to the attached drawings.

BRIEF DESCRIPTION OF THE DRAWINGS

FIG. 4b represents the output signal of the conditioning device resulting from the movement of the blade in FIG. 4a;

DESCRIPTION OF THE PREFERRED EMBODIMENTS

Figure 1:
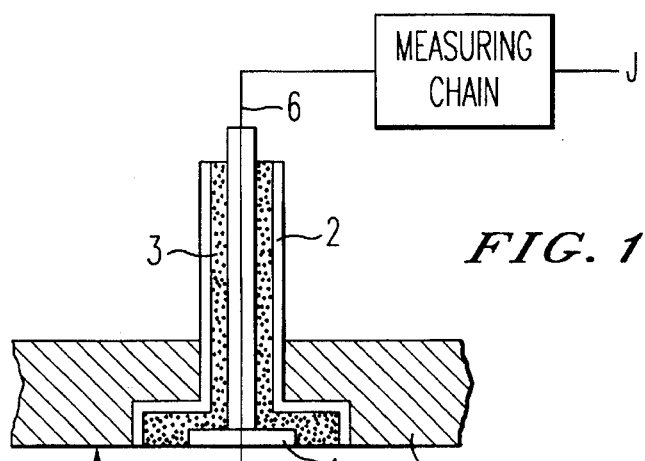
FIG. 1 is a sectional view showing one example of a capacitive sensor set up in a casing as part of a device in accordance with the invention.

With reference to FIG. 1, the capacitive sensor is of coaxial construction and comprises a central electrode 1 mounted in a sheathed cable 2 with the aid of an insulator 3. The cable 2 is secured in an opening made in the wall of the casing 4 and in such a way that the electrode 1 is flush with the surface of the casing facing the rotor blades 5. The sheath of the cable 2 is connected to the same potential as the casing.

The casing electrode is connected, by means of a coaxial connection 6, to a measuring chain for determination of the value of the clearances J between the tips of the blades 7 and the casing 4.

The tips of the blades move past the sensor electrode in a direction shown by the arrow 8. Each blade tip forms, with the sensor electrode, a capacitor with a capacitance which depends upon the distance separating the tip of the blade from the electrode. To measure this capacitance, the capacitive sensor is polarized by a direct voltage and conditioned by a continuous polarization load amplifier.

Figure 2:
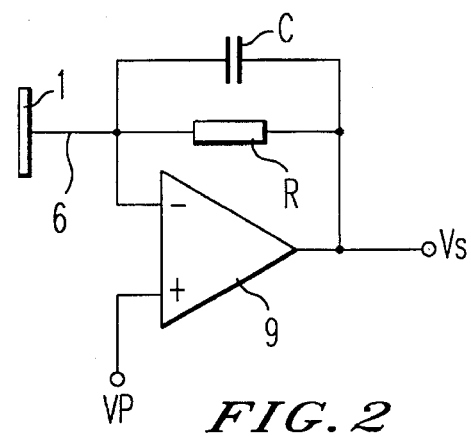
FIG. 2 is a diagram of an example of a conditioning device having the structure of a high-pass filter of the first order in a first embodiment of the invention.

FIG. 2 shows a diagram of one embodiment of a conditioning device which may be used, the electrode 1 of the capacitive sensor being connected by means of the coaxial connection 6 to a load amplifier polarized by a direct voltage VP and having a high-pass filter structure of the first order.

This load amplifier comprises an operational amplifier 9 having a positive input terminal supplied by a direct voltage VP, a negative input terminal connected to the electrode 1 of the capacitive sensor and raised to the same potential as the positive input terminal (basic principle of operational amplifiers), and an output terminal delivering an output signal Vs depending on the capacitance resulting from the passing of the blades under the sensor. This capacitance is variable over the course of time, it being almost nil when the tips of the blades are distant from the sensor electrode and being at a maximum when a blade tip is immediately below the sensor electrode.

A resistor R and a capacitor C are connected in parallel between the negative input terminal and the output terminal of the operational amplifier. The values of the resistor and the capacitor are selected so that the load amplifier constitutes a high-pass filter having a cut-off frequency, fc=1/(2πRC), lower than the passing frequency of the blades and greater than the frequency of the variations of the residual capacitances of the sensor and the coaxial connection.

In this way it is only the variation of capacitance due to the passing of the blades under the electrode of the sensor that is taken into account, and the output signal Vs of the load amplifier depends only upon the geometry of the capacitor constituted by the electrode of the sensor and the tip of a blade, on the gain of the load amplifier, and in particular on the integrating capacitor C.

In FIG. 2, the load amplifier has a high-pass filter structure of the first order. To obtain better performance, it is preferable to use a conditioning device having a high-pass filter structure of the second order. Such a structure gives a better rejection of any stray low frequencies, better dynamics, and effects a permanent monitoring of the insulation resistance of the sensor.

Figure 3:
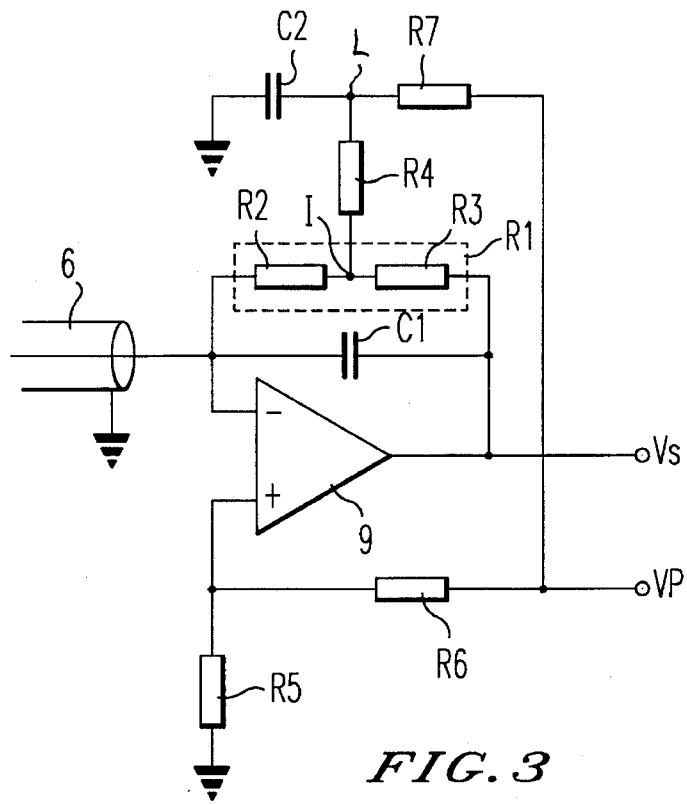
FIG. 3 is a diagram of a conditioning device having the structure of a high-pass filter of the second order in a second embodiment of the invention.

An example of a conditioning device with a high-pass filter structure of the second order is shown in FIG. 3, the device comprising an operational amplifier 9 with a negative input terminal connected to the electrode of the capacitive sensor, a positive input terminal, and an output terminal. A resistor R6 is connected between the positive input terminal and a polarization voltage VP, and a resistor R5 is connected between the positive input terminal and the electrical earth of the device. A capacitor C1 and a resistor R1 are connected in parallel between the negative input terminal and the output terminal, the resistor R1 being formed by two resistors R2 and R3 connected in series at a junction Point I. A resistor R4 is connected between the point I and a point L, a resistor R7 is connected between the point L and the voltage VP, and a capacitor C2 is connected between the point L and the electrical earth of the conditioning device. The values of the different resistances are chosen so that the continuous component of the output signal Vs is nil, assuming that the insulation resistance of the sensor is infinite.

In these conditions, the gain of the conditioning device is $$G = \frac{1}{C1} \cdot \frac{R5}{R5+R6},$$

and the output voltage of the conditioning device is Vs=G.VP.ΔC blade, wherein ΔC represents the variation of capacitance due to the passing of the blades under the electrode of the sensor.

This variation of capacitance is proportional to the area s(x) of the capacitor constituted by the electrode and the tip of the blade facing the sensor at the time of measuring, and inversely proportional to the clearance J, where x represents the position of the blade relative to the sensor. Hereinafter, the area s(x) will be termed the common area between the electrode and the blade tip.

Figure 4A:
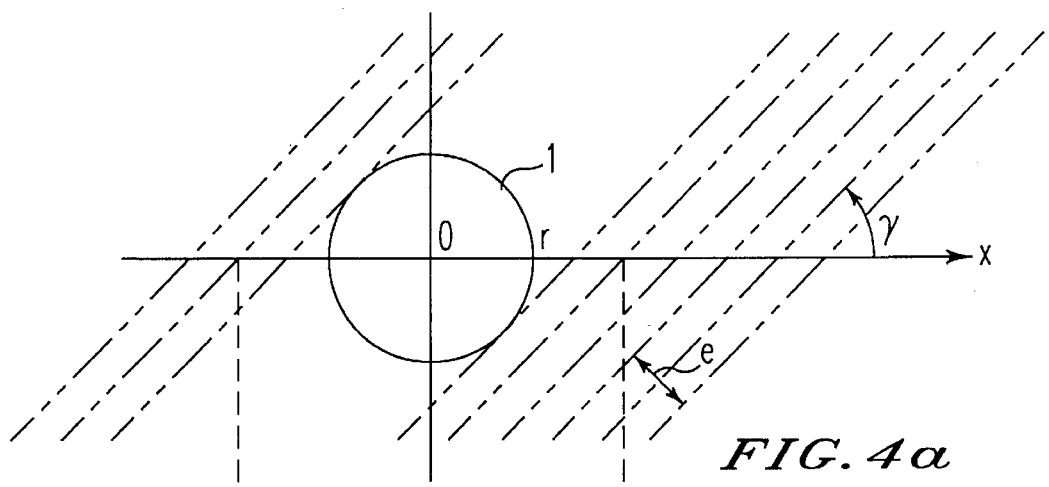
FIG. 4a is a diagram representing an isolated blade moving at a constant rate in front of a sensor electrode.
Figure 4B:
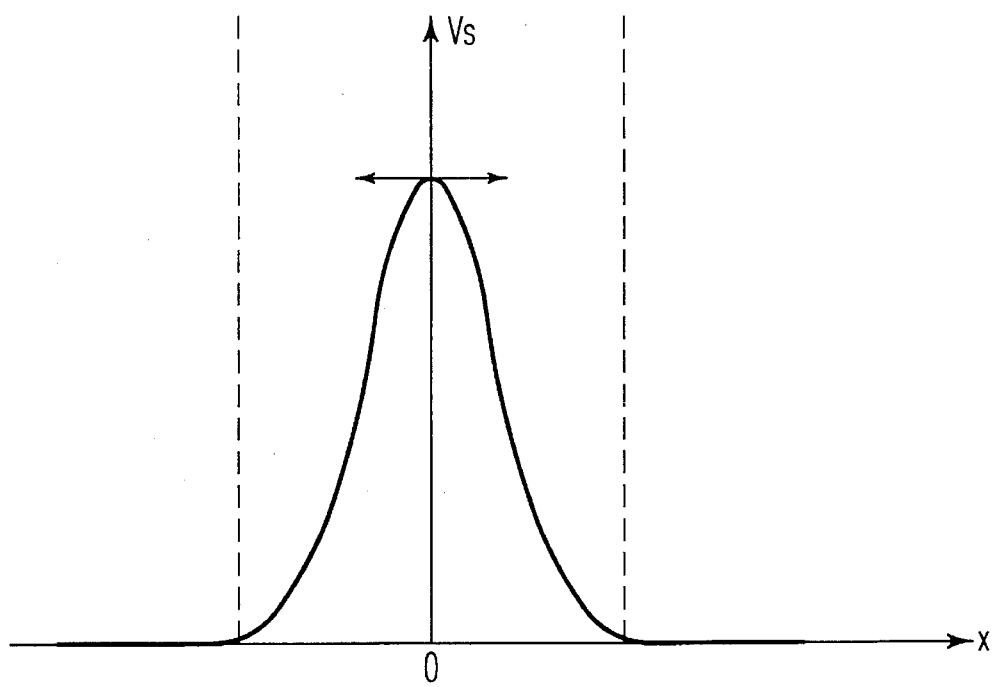

FIG. 4a is a schematic plan view of an isolated blade moving at a constant rate past a sensor electrode, and FIG. 4b illustrates the output signal of the conditioning device corresponding to the pass shown in FIG. 4a.

The electrode of the sensor represented in FIG. 4a is shaped as a disc of radius r. The blade which passes in front of this electrode at a constant rate and in the direction x is approximated to a blade with parallel faces and a thickness e lower than the diameter 2r of the electrode, and with a pitch angle γ.

When the tip of the blade is distant from the electrode of the sensor, there is no common area between the electrode and the tip of the blade and the output signal of the conditioning device is nil, as the latter is a high-pass filter which rejects the stray low frequencies lower than the frequency of passage of the blades under the sensor.

When the tip of the blade is under the sensor electrode, the output signal Vs of the conditioning device varies proportionally to the common area s(x) between the electrode and the tip of the blade. The output signal of the conditioning device therefore has the shape of a pulse of maximum amplitude VSmax proportional to the polarization voltage VP and to the maximum common area Smax and inversely proportional to the clearance J between the electrode and the tip of the blade. The waveform of the signal Vs is identical with the waveform of s(x).

In the case of a rotating bladed wheel including identical evenly spaced blades, the output signal of the conditioning device is constituted by a succession of pulses of recurring frequency equal to the frequency of the passing of the blades under the sensor electrode. As a consequence of the high-pass filter structure of the conditioning device, the mean value of this signal is nil. Thus, when the geometric characteristics of the assembly constituted by the sensor and the blades and the area Smax are known precisely, the fluctuations of the output signal of the conditioning device may be determined theoretically prior to measuring. The calibration of the measuring chain can thus be carried out in a theoretical manner without the need to perform any actual testing.

Figure 5:
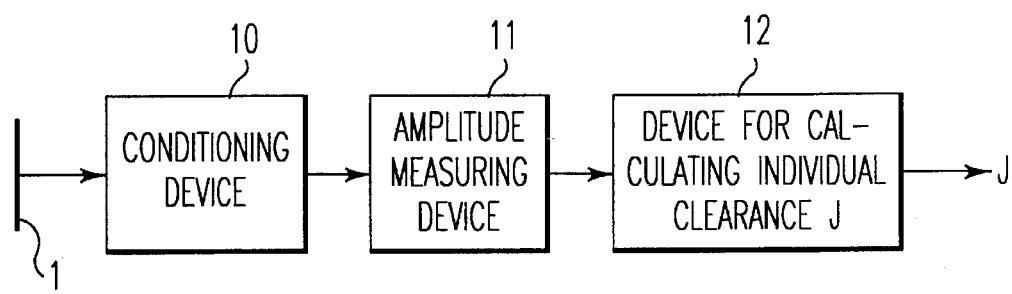
FIG. 5 is a block diagram of the measuring chain in an embodiment of the invention for measurement of the individual clearance of each blade.

FIG. 5 shows a block diagram of a measuring chain for measurement of the individual clearance of each blade, the chain being connected to the electrode 1 of a capacitive sensor by means of a coaxial cable. It comprises in series, a conditioning device 10, an amplitude measuring device 11, and a device 12 for the computation of the individual clearance J of each blade. The measuring device 11 is intended to measure the maximum individual amplitude VSmax of each pulse obtained at the output of the conditioning device 10. The device 12 for computing the individual clearances J is intended to perform the following operation:

$$J = (A \cdot VP/Vsmax) \cdot Smax$$

wherein A is a constant equal to G$\epsilon$o, where $\epsilon$o represents the dielectric constant of the insulator, generally constituted by dry air, of the capacitor formed by the blade tip and the sensor electrode, assuming that this capacitor behaves like a plane capacitor.

A precise knowledge of Smax for each blade is obtained only when the thickness of each blade is accurately known.

A precise measurement of the amplitude of each pulse may be performed in a known manner, for example starting from a synchronization top, by a first sampling of the signal immediately before the start of the pulse, and a second sampling of the signal when its value is close to the maximum of the pulse, and then arriving at the difference of the two values thus obtained.

Figure 6:
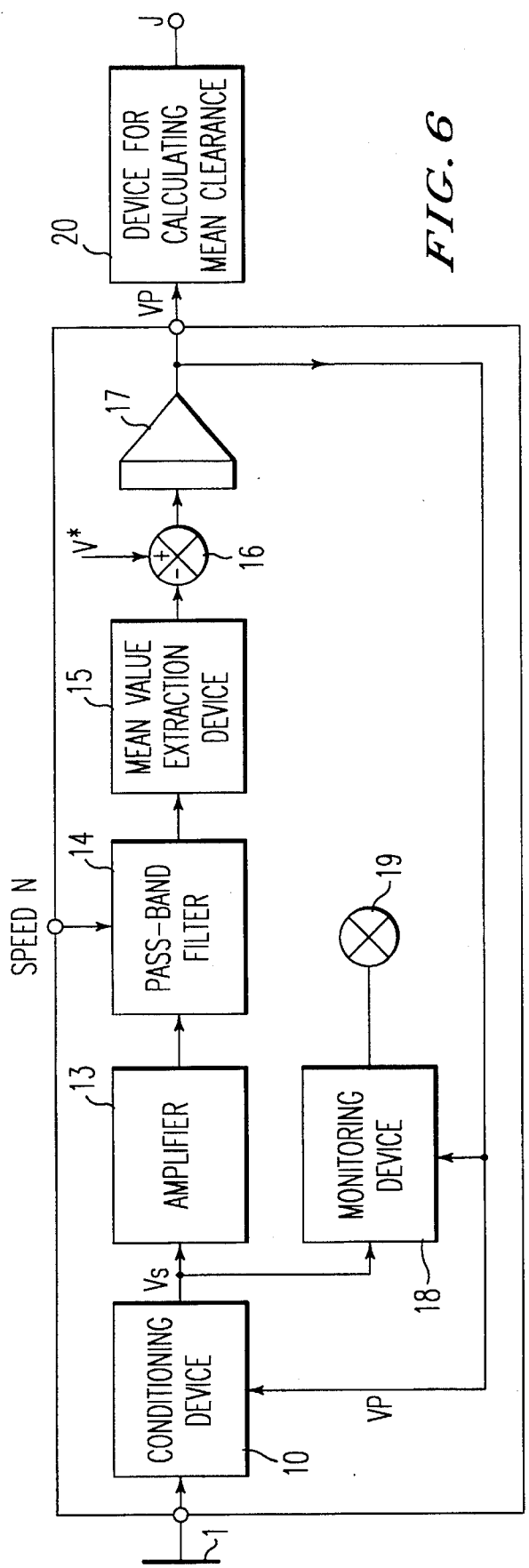
FIG. 6 is a block diagram of the measuring chain in an embodiment of the invention for the measurement of the mean clearance of the blading, when the blading geometry is perfectly known; and, FIG. 7 is a block diagram of the measuring chain in an embodiment for use in the case where the blading geometry is not known.

FIG. 6 shows a block diagram of a measuring chain for measurement of the mean clearance of the blading when the blading geometry is perfectly known and when all the blades are identical.

The measuring chain is connected to the electrode of a capacitive sensor by means of a coaxial connection, and comprises an integral loop which includes, in series, a conditioning device 10, a voltage amplifier 13 of gain K, a band-pass filter 14 programmed as a function of the rotational speed of the turbomachine rotor so that the filtering gauge remains constant whatever the speed N of the engine, a device 15 for deriving the mean value, and a comparison device 16 for comparing the value of the signal with a voltage reference value, the result of the comparison being transmitted to an integrating device 17 having an infinite continuous gain and delivering a direct voltage value VP which is transmitted back to the conditioning device 10 as the polarization voltage value.

The integral loop is therefore a regulation loop for the amplitude of the polarization voltage VP of the conditioning device. This regulation is carried out so that, at equilibrium, the mean value of the output signal of the conditioning device, after amplification and filtering, is equal to the voltage reference value V*.

The measuring chain also comprises a device 18 for monitoring the insulation resistance of the sensor, and a signalling device 19 connected to the device 18. The monitoring device 18 receives as inputs the values of the output voltage VS and the polarization voltage VP of the conditioning device, and makes a comparison between these two values so as to detect any deterioration of the insulation resistance of the sensor. When a deterioration is detected the monitoring device 18 despatches to the signalling device 19 an alarm triggering signal.

A precise knowledge of the geometric characteristics of the assembly constituted by the capacitive sensor and the blading makes it possible to know precisely the mean common area So between the electrode and the blade tip. This mean area is computed mathematically from the change of s(x). In the case where the blade tips may be regarded as blades with parallel faces and where the electrode of the capacitive sensor is circular, the mean area So may be expressed as follows:

$$So = (\pi \cdot r^2 \cdot e) / (Xo \cdot \sin \gamma)$$

wherein r is the radius of the electrode of the capacitive sensor, e is the blade thickness, Xo is the blade pitch and $\gamma$ is the blade pitch angle.

The calibration of the measuring chain is then carried out by laying down a voltage reference value which is $$V^* = B \cdot So^* \text{ (filtered)}$$

so that, at equilibrium, the following relationship is satisfied:

$$VP \cdot A \cdot \frac{So \text{ (filtered)}}{J} \cdot K = B \cdot So^* \text{ (filtered)}$$

wherein B is a constant coefficient obtained by calculation for a particular clearance value and So* (filtered)=So (filtered), the filtration gauge being the same as that of the filter 14.

When equilibrium is achieved, the value of the polarization voltage VP is proportional to the mean clearance of the blading, as the filtration gauge is constant whatever the rotational speed of the turbomachine rotor. The value of the voltage VP supplied by the integrating device 17 is transmitted to a device 20 for computing the mean clearance between the electrode of the sensor and the tips of the blades.

Figure 7:
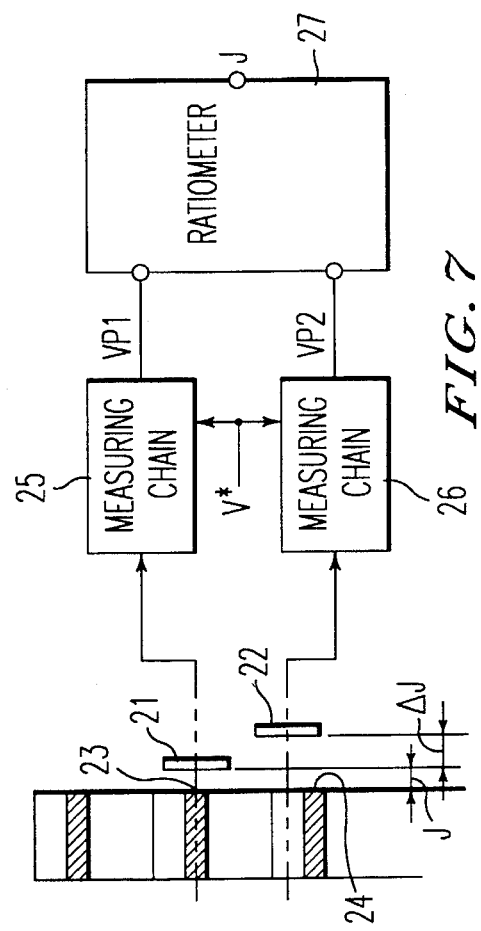

FIG. 7 shows a block diagram of a measuring chain for the case where the geometry of the blading is not known. The blading cannot always be regarded as a succession of blades with parallel faces due, in particular, to the shape of the blades at the tips, to the non-mastery of the axial positions of the blading, and to differences in blade thickness. Consequently, according to the respective position of the sensor electrode relative to the tips of the blades, the changes in the common area s(x) are different, and correspond to different calibrations. In this case, the invention involves setting up in the stator two identical capacitive sensors 21 and 22 with a different clearance J and J+$\Delta$J relative to the blade tips 23, 24, the sensors being arranged in a common plane perpendicular to the axis of the rotary machine so as to "see" the same area of blade s(x).

The clearance J is the clearance to be measured, the clearance $\Delta$J being known.

The capacitive sensors 21 and 22 are connected respectively to two measuring chains 25, 26 having identical electrical gains and calibrated in the same way by laying down for them identical voltage reference values from the same display. This voltage reference value V* is calculated with an approximate value S'o, but of the same order of magnitude, for the common mean area between the electrode of one of the sensors and the tips of the blades, the value of S'o ranging between 0.1 So and 10 So wherein So represents the real common area. The output signals VP1 and VP2 of each of the measuring chains are transmitted to a ratiometer 27 arranged to output a measurement of the mean clearance J between the facing surfaces of the casing and the tips of the blades.

If k' is the voltage gain of each measurement chain, the output signals VP1 and VP2 are respectively equal to:

$$VP1 = k'J/S'o$$

$$VP2 = k'(J+\Delta J) / S'o$$

To obtain a measurement of the mean clearance J, the ratiometer 27 performs the following operation $$J = \Delta J \cdot \frac{VP1}{VP1 - VP2}$$

When the value of the clearance is determined, the ratiometer enables a computation of the mean blade area So actually "seen" by the capacitive sensors. This mean area can then be displayed on other possible measuring chains, not fitted with a ratiometer, used on the same stage of the rotor.

The invention is not limited to the embodiments as hereinabove described. In particular, for safety reasons the electrode of the sensor may be inset into the casing. In this case, it is necessary to take into account the value R of the inset for establishing the desired calibration value by replacing all the J terms, denoting the clearance measured by the sensor, by the term J+R. Also, the geometry of the electrode may differ from that of a disc.

We claim:

1. A device for effecting dynamic measurement of the clearance between the tips of rotating blades and the stator of a turbomachine, comprising at least one capacitive sensor intended to be mounted in the stator in line with said blades, said sensor having an electrode intended to cooperate with the tips of said blades so as to define a capacitor with variable capacitance every time a blade passes under the electrode of said sensor, and at least one measuring chain connected to said sensor, said measuring chain including a device for conditioning the sensor and providing an output signal, and means for processing the signal from said conditioning device, wherein said conditioning device comprises a load amplifier having a high-pass filter structure, and said capacitive sensor and said load amplifier are arranged to be polarized by the same direct voltage, said direct polarization voltage being determined in such a manner that the mean value of said output signal from said conditioning device is equal to a desired voltage value.

2. A device according to claim 1, wherein said measuring chain is connected to the electrode of said capacitive sensor by means of a coaxial connection.

3. A device according to claim 1, wherein said load amplifier having a high-pass filter structure comprises an operational amplifier having a positive input terminal, a negative input terminal and an output terminal, and at least one resistor and a capacitor connected in parallel across said negative terminal and said output terminal, said positive input terminal being connected to said direct polarization voltage, and said negative input terminal being connected to said electrode of said capacitive sensor and raised to the same potential as said positive input terminal.

4. A device according to claim 3, wherein said high-pass filter structure is of the second order and said output terminal delivers an output signal proportional to said polarization voltage and to capacitance fluctuations due to the passing of said blades under the electrode of said sensor.

5. A device according to claim 4, wherein said measuring chain includes, in series with said conditioning device, an amplitude measuring device and a device for computation of the clearance of each individual blade.

6. device according to claim 4, wherein said measuring chain includes an integral loop for regulation of the polarization voltage of said conditioning device, said loop comprising, in series with said conditioning device, a voltage amplifier, a band-pass filter, a mean value extraction device, a device for comparing the signal from said mean value extraction device with a desired voltage value, an integrating device with infinite continuous gain for delivering a direct voltage proportional to the mean clearance between the electrode of said sensor and the tips of said blades, and means for transmitting said delivered direct voltage back to said conditioning device as said polarization voltage value.

7. A device according to claim 6, wherein said measuring chain also includes a device for monitoring the insulation resistance of said sensor, and an alarm signalling device connected to said monitoring device.

8. A device according to claim 6, wherein said band-pass filter is programmed as a function of the rotational speed of said blades so that the filtration limits remain constant whatever the value of said rotational speed.

9. A device according to claim 8, wherein said desired voltage value is mathematically determined on the basis of knowledge of the geometric characteristics of the assembly constituted by said capacitive sensor and said blades, and is proportional to the common filtered mean area between the electrode of said sensor and the tips of said blades, the value of the coefficient of proportionality being determined by setting a particular clearance value, and the filtration limits of said mean area being the same as those of said band-pass filter.

10. A device according to claim 9, wherein said measuring chain further includes a device for receiving the value of the voltage delivered by said integrating device and for computing the mean clearance between said sensor electrode and the tips of said blades.

11. A device according to claim 1, wherein there are two capacitive sensors intended to be mounted in said stator in line with said blades, and in the same plane perpendicular to the axis of the turbomachine, so that there is a different clearance between each sensor and the tips of said blades and the difference between the two clearances is known, and there are two measuring chains connected one to each of said sensors, said measuring chains having identical electrical gains and being calibrated in the same manner by setting identical voltage reference values, and wherein said device further includes means connected to receive the output signals from said two measuring chains and arranged to make a comparison of said two output signals and to supply a value for the mean clearance between one of said sensor electrodes and said blade tips.

12. A device according to claim 11, wherein said voltage reference value set for said two measuring chains is determined mathematically by fixing an approximate value for the common mean area between the electrode of one of said sensors and the tips of said blades.

* * * * *

UNITED STATES PATENT AND TRADEMARK OFFICE
CERTIFICATE OF CORRECTION

PATENT NO. : 5,497,101
DATED : MARCH 05, 1996
INVENTOR(S) : JEAN-CLAUDE FILLION

It is certified that error appears in the above-indentified patent and that said Letters Patent is hereby corrected as shown below:

Column 4, line 30, change "G.VP.$\Delta$C blade to --G·VP·$\Delta$C.

Column 5, line 21, change "VSmax" to --Vsmax--.

Column 5, line 25, change "J=(A.VP/Vsmax).Smax to

--J=(A·VP/Vsmax)·Smax--.

Column 5, line 27, change G.$\epsilon$o to --G·$\epsilon$o--.

Column 6, line 6, change "despatches" to --dispatches--.

Column 6, line 17, change "So=($\pi$.r$^2$.e/(Xo.sin $\gamma$) to

--So=($\pi$·r$^2$·e)/(Xo·sin $\gamma$)--.

Column 6, line 25, change "V* =B.So*(filtered) to

--V* =B·So*(filtered)--.

UNITED STATES PATENT AND TRADEMARK OFFICE
CERTIFICATE OF CORRECTION

PATENT NO. : 5,497,101

DATED : March 5, 1996

INVENTOR(S) : Jean-Claude Fillion

It is certified that error appears in the above-indentified patent and that said Letters Patent is hereby corrected as shown below:

Column 6, line 50, delete "," after "different".

Signed and Sealed this

Nineteenth Day of November, 1996

Attest:

BRUCE LEHMAN

*Attesting Officer*   *Commissioner of Patents and Trademarks*